(12) United States Patent
Zechbauer

(10) Patent No.: US 6,698,783 B1
(45) Date of Patent: Mar. 2, 2004

(54) TRAILER HITCH GUIDE

(76) Inventor: Carl A. Zechbauer, 1031 Griffin Ave., Mahtomedi, MN (US) 55115

( * ) Notice: Subject to any disclaimer, the term of this patent is extended or adjusted under 35 U.S.C. 154(b) by 0 days.

(21) Appl. No.: 10/139,027

(22) Filed: May 2, 2002

(51) Int. Cl.[7] ............................................... B60D 1/00
(52) U.S. Cl. ..................................... 280/477; 280/508
(58) Field of Search ................................. 280/477, 504, 280/508, 478.1, 511

(56) References Cited

U.S. PATENT DOCUMENTS

| | | | |
|---|---|---|---|
| 2,048,310 A | 7/1936 | Wohldorf | 280/33.15 |
| 2,478,736 A | 8/1949 | Balzer | 280/33.15 |
| 2,791,443 A | 5/1957 | Allard | 280/477 |
| 2,920,907 A | 1/1960 | Bremer | 280/477 |
| 4,254,968 A | 3/1981 | DelVecchio | 280/477 |
| 4,560,183 A | 12/1985 | Cook | 280/477 |
| 4,657,275 A | 4/1987 | Carroll | 280/477 |
| 4,903,978 A | 2/1990 | Schrum, III | 280/477 |
| 5,080,386 A | 1/1992 | Lazar | 280/477 |
| 5,277,446 A * | 1/1994 | Hamel | 280/477 |
| 5,290,056 A * | 3/1994 | Fath, IV | 280/477 |
| 5,309,289 A * | 5/1994 | Johnson | 359/871 |
| 5,435,587 A | 7/1995 | Beddows | 280/477 |
| 5,454,582 A * | 10/1995 | Rines | 280/477 |
| 5,503,422 A | 4/1996 | Austin | 280/477 |
| 5,758,893 A | 6/1998 | Schultz | 280/477 |
| 5,909,892 A | 6/1999 | Richardson | 280/477 |

* cited by examiner

Primary Examiner—Lesley D. Morris
Assistant Examiner—Tony Winner
(74) Attorney, Agent, or Firm—Sherrill Law Offices, PLLC; Elizabeth D. Lewen

(57) ABSTRACT

The invention is an articulated frame for attachment to a trailer hitch for purposes of facilitating alignment and coupling of the trailer hitch to a vehicle hitch.

7 Claims, 15 Drawing Sheets

TRAILER HITCH GUIDE

FIELD OF THE INVENTION

This invention relates to a device for guiding a forward end of a trailer tongue into coupling engagement with a receiver hitch of a towing vehicle.

BACKGROUND

Vehicles have been used to tow a wide variety of trailers for many years. For example, boat trailers, utility trailers, tent trailers, agricultural trailers; vehicles have towed all dual axle trailers, among others. A vehicle hitch and trailer coupling or hitch are commonly used to couple the vehicle to the trailer. Various devices have been developed to assist coupling the vehicle to the trailer. For ease of discussion, the coupling between a boat trailer and a truck will be described. Typically, the vehicle receiver hitch is mounted to a rearward portion of the truck frame and the trailer coupling is mounted to the tongue of the trailer. Vehicle receiver hitches are available that include a removable ball mount. The ball mount has one end that engages within the receiver hitch and the other end includes a drop or rise with an aperture extending through the end. A hitch ball includes a threaded bolt extending from the ball. Thus, the ball may be bolted to the ball mount through the aperture, with the ball mount oriented in the rise or drop position. The trailer coupling or hitch typically includes a socket that fits over the ball and includes a latch that wraps under a portion of the ball to restrict removal of the ball from the socket.

When the load on the trailer is positioned over the axles of the trailer and/or the weight on the trailer is minimal, the tongue weight may be light enough for the user to elevate the tongue and pull the trailer into alignment and engagement with the vehicle hitch. However, the user may not always be able to elevate the tongue and pull the trailer into alignment with the vehicle hitch. Thus, in those instances, the vehicle must be maneuvered so that the hitch ball of the vehicle hitch aligns with the trailer hitch attached to the forward end of the tongue of the trailer.

When backing the towing vehicle towards the trailer, oftentimes it is difficult for the driver to see both the forward end of the trailer tongue and the vehicle hitch. The inability to see both the forward end of the trailer tongue and the vehicle hitch may lead to misalignment and may require several attempts to align the vehicle hitch and trailer tongue. Once the trailer hitch and tongue are aligned, the bottom of the trailer hitch needs to be elevated above the hitch ball extending above the ball mount of the vehicle hitch. A jack attached to the tongue of the trailer has been used to elevate the tongue of the trailer.

U.S. Pat. No. 5,503,422 issued to Austin describes a hitch alignment apparatus that mounts underneath the drawbar or ball mount of the vehicle hitch. The hitch alignment apparatus includes a ramp and sides that guide and center the forward end of the trailer tongue until the forward end strikes a backing plate of the hitch alignment apparatus. The friction between the ramp and the trailer tongue is substantial and a significant force is required to force the trailer tongue up the ramp. Once the forward end of the tongue strikes the backing plate, the user then uses a jack to elevate the tongue above the ramp and then removes the hitch alignment apparatus from the ball mount. The user then lowers the trailer tongue until the coupling member of the trailer tongue engages the hitch ball of the vehicle hitch. The manual raising and lowering of the trailer tongue and the removal of the hitch alignment apparatus before coupling the trailer to the vehicle is time consuming and is not preferred.

U.S. Pat. No. 4,903,978 issued to Schrum III recognizes that past devices have attempted to provide means for aligning the trailer socket and ball, however, the past devices were indicated as too expensive to construct or too complicated to operate. Although Schrum III apparently describes a self-aligning trailer hitch, the hitch described by Schrum III also has shortcomings that are overcome by the present invention. Schrum III describes a trailer hitch having a ramp pivotally mounted to the ball mount oriented with a rise and a support element welded to the ball mount. The ramp requires doors that open when the ramp drops over the hitch ball. Rollers are attached to a forward side and upper forward end of a ball socket of the trailer tongue. The trailer hitch described by Schrum III is not operable with a trailer mount oriented with a drop. Further, when the tongue weight exceeds a certain amount, the roller assembly described by Schrum III is likely to rotate upward causing the bottom of the coupling to scrape along the ramp. Also, if the trailer and vehicle are not on an even surface, for example, if the vehicle is on a flat portion and the trailer is on a slight incline, the rollers described by Schrum III may prove ineffective and the bottom of the coupling may come into direct contact with the ramp, thereby substantially increasing the force required to force the coupling up the ramp. Thus, a need exists for a trailer hitch guide that effectively elevates and guides a forward end of the trailer hitch into coupling engagement with a receiver hitch of a towing vehicle, wherein the guide is operable with a ball mount oriented with a rise or drop, and wherein friction between the guide and trailer tongue is reduced. The present invention meets these and other needs that will become apparent from a review of the description of the present invention.

SUMMARY OF THE INVENTION

The invention is directed to a frame for attachment to a trailer hitch.

The first aspect of the invention is a frame for attachment to a trailer hitch, having longitudinally spaced forward and rearward ends, for purposes of facilitating alignment and coupling of the trailer hitch to a vehicle hitch. The frame comprises a first mounting arm attached to the trailer hitch, a second mounting arm attached to the trailer hitch, and an articulated contact plate. The articulated contact plate is repositionally attached to the first and second mounting arms for repositioning of the contact plate as between a first position and a second position. In the first position the contact plate longitudinally extends past the forward end of the trailer hitch. In the second position the contact plate does not longitudinally extend past the forward end of the trailer hitch.

The second aspect of the invention is a frame for attachment to a trailer hitch having longitudinally spaced forward and rearward ends and a bottom, for purposes of facilitating alignment and coupling of the trailer hitch to a vehicle hitch. The frame comprises a first mounting arm attached to the trailer hitch, a second mounting arm attached to the trailer hitch, and a contact plate. The first mounting arm has a longitudinal axis, a first end, a second end, and a longitudinally extending first slot proximate the first end. The second mounting arm has a longitudinal axis, a first end, a second end, and a longitudinally extending second slot proximate the first end. The articulated contact plate has a proximal end, a distal end, and a longitudinally extending ledge positioned near the distal end. The articulated contact plate is repositionally attached to the first and second mounting arms for repositioning of the contact plate as between a primary position and a secondary position. In the primary position the contact plate is positioned and arranged so as to form a longitudinal gap between the ledge and the forward end of the trailer hitch. In the secondary position the contact plate is positioned and arranged so that the bottom of the forward end of the trailer hitch rests on the ledge and no longitudinal gap is formed.

The third aspect of the invention is a frame for attachment to a trailer hitch having longitudinally spaced forward and rearward ends, for purposes of facilitating alignment and coupling of the trailer hitch to a vehicle hitch. The frame comprises a first articulated brace, a second articulated brace, and a face plate. The first articulated brace has a first end, a second end, and a first joint intermediate the first end and the second end. The second articulated brace has a first end, a second end, and a second joint intermediate the first end and the second end. The face plate is attached proximate the first end of the first brace and the first end of the second brace. The face plate is repositionable as between a first position and a second position. In the first position the face plate longitudinally extends past the forward end of the trailer hitch. In the second position the face plate does not longitudinally extend past the forward end of the trailer hitch.

The fourth aspect of the invention is a frame for attachment to a trailer hitch having longitudinally spaced forward and rearward ends and a bottom, for purposes of facilitating alignment and coupling of the trailer hitch to a vehicle hitch. The frame comprises a first articulated brace attached to the trailer hitch, a second articulated brace attached to the trailer hitch, and a face plate. The first articulated brace has a longitudinal axis, a first end, a second end, and a first joint intermediate the first end and the second end. The second articulated brace has a longitudinal axis, a first end, a second end, and a second joint intermediate the first end and the second end. The face plate has a longitudinally extending ledge attached proximate the first end of the first brace and the first end of the second brace. The face plate is repositionable as between a primary position and a secondary position. In the primary position the face plate is positioned and arranged so as to form a longitudinal gap between the ledge and the forward end of the trailer hitch. In the secondary position the face plate is positioned and arranged so that the bottom of the forward end of the trailer hitch rests on the ledge and no longitudinal gap is formed.

DETAILED DESCRIPTION OF THE INVENTION INCLUDING A BEST MODE

Nomenclature

10 Trailer Hitch Guide Assembly
12 Base
14 Ramp
16 Support Arm
18 Wheels
20 Forward End of a Trailer Coupler or Hitch
21 Rearward End of a Trailer Coupler or Hitch
22 Trailer Coupler or Hitch
23 Bottom of a Trailer Coupler or Hitch
24 Socket
26 Hold Down Assembly
28 Latch
30 Ball
32 Frame
34 Bolt
36 Ledge
38 Lip Member
40 Crossbar of the Support Arm
42 Upper Plate
44 Lower Plate
46 Nut
48 Ball Mount
50 Hitch Pin
52 Spring Clip
54 Hitch Pin
56 Hitch Pin
58 HoldDown Angle Bolt
60 Pin
62 Groove Formed in Support Arm
64 Side of the Ramp
232 Frame
234 Bolt
236 Ledge
238 Lip Member
240 First Mounting Arm
241 Longitudinal Axis of First Mounting Ar
242 First End of First Mounting Arm
243 Second End of First Mounting Arm
247 Second Mounting Bore
248 First Mounting Bore
249 First Slot 250 Second Mounting Arm
251 Longitudinal Axis of Second Mounting Arm
252 First End of Second Mounting Arm
253 Second End of Second Mounting Arm
257 Second Mounting Bore
258 First Mounting Bore
259 Second Slot
260 Articulated Contact Plate
261 Proximal End of Articulated Contact Plate
262 Distal End of Articulated Contact Plate
270 First Shaft
280 Second Shaft
332 Frame
334 Bolt
336 Ledge
338 Lip Member
340 First Brace
341 First End of First Brace
342 Second End of First Brace
343 Longitudinal Axis of First Brace
344 First Joint
347 Second Mounting Bore
348 First Mounting Bore
349 First Slot
350 Second Brace
351 First End of Second Brace
352 Second End of Second Brace
353 Longitudinal Axis of Second Brace
354 Second Joint
357 Second Mounting Bore
358 First Mounting Bore
359 Second Slot
360 Face Plate
370 First Shaft
380 Second Shaft Construction The present invention represents broadly applicable improvements to a trailer hitch guide. The embodiments detailed herein are intended to be taken as representative or exemplary of those in which the improvements of the invention may be incorporated and are not intended to be limiting. For purposes of discussion, and without any limitation intended, the trailer hitch guide 10 of the present invention will be described in conjunction with a class III receiver hitch 22 of known suitable construction. Those skilled in the art will appreciate that the trailer hitch guide 10 of the present invention may be utilized with a variety of other available trailer hitches 22.

Figure 1:
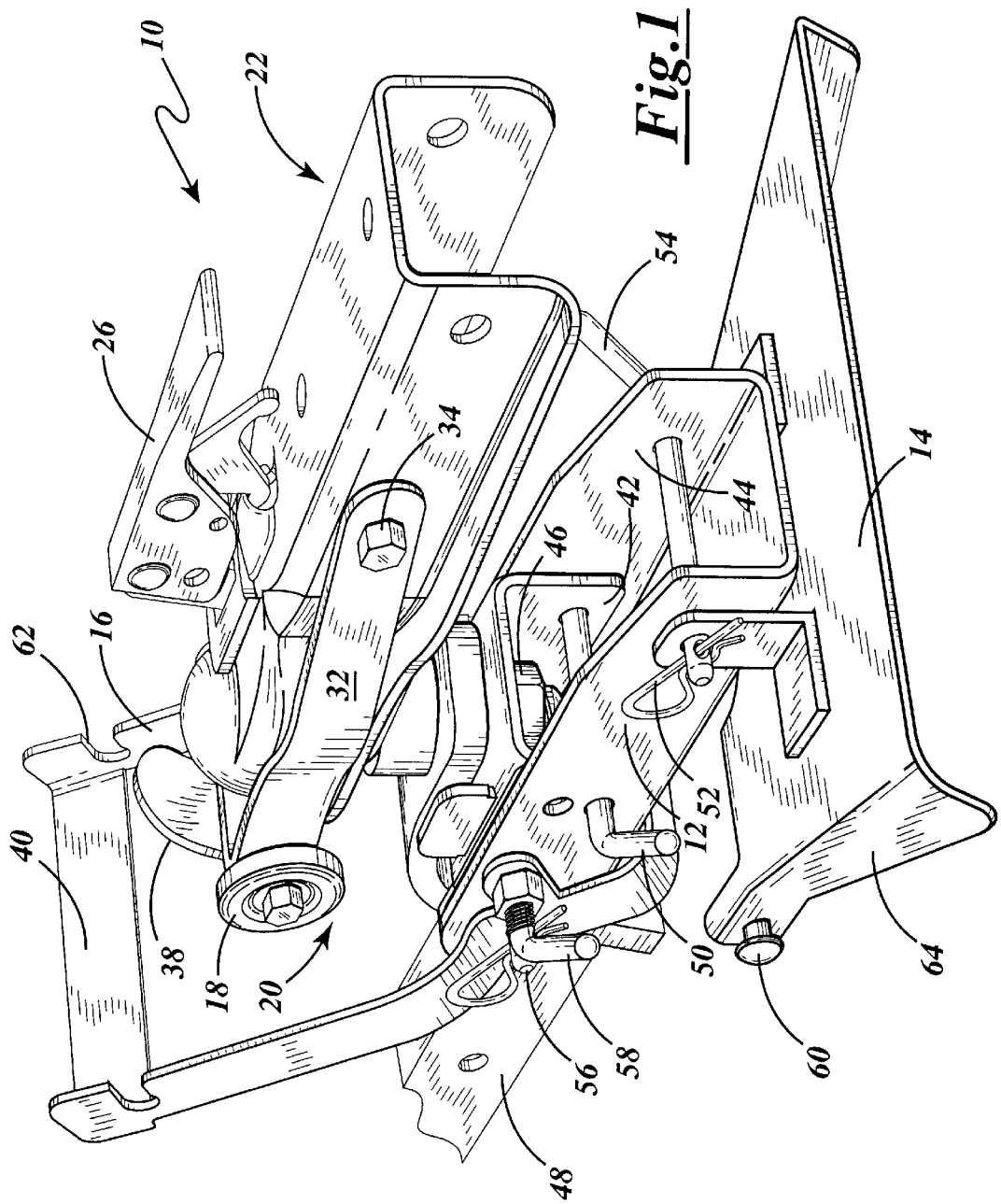
FIG. 1 is a front perspective view of a trailer coupler engaged and coupled to a hitch ball of the vehicle hitch with the hitch guide of the present invention mounted to the ball mount.
Figure 2:
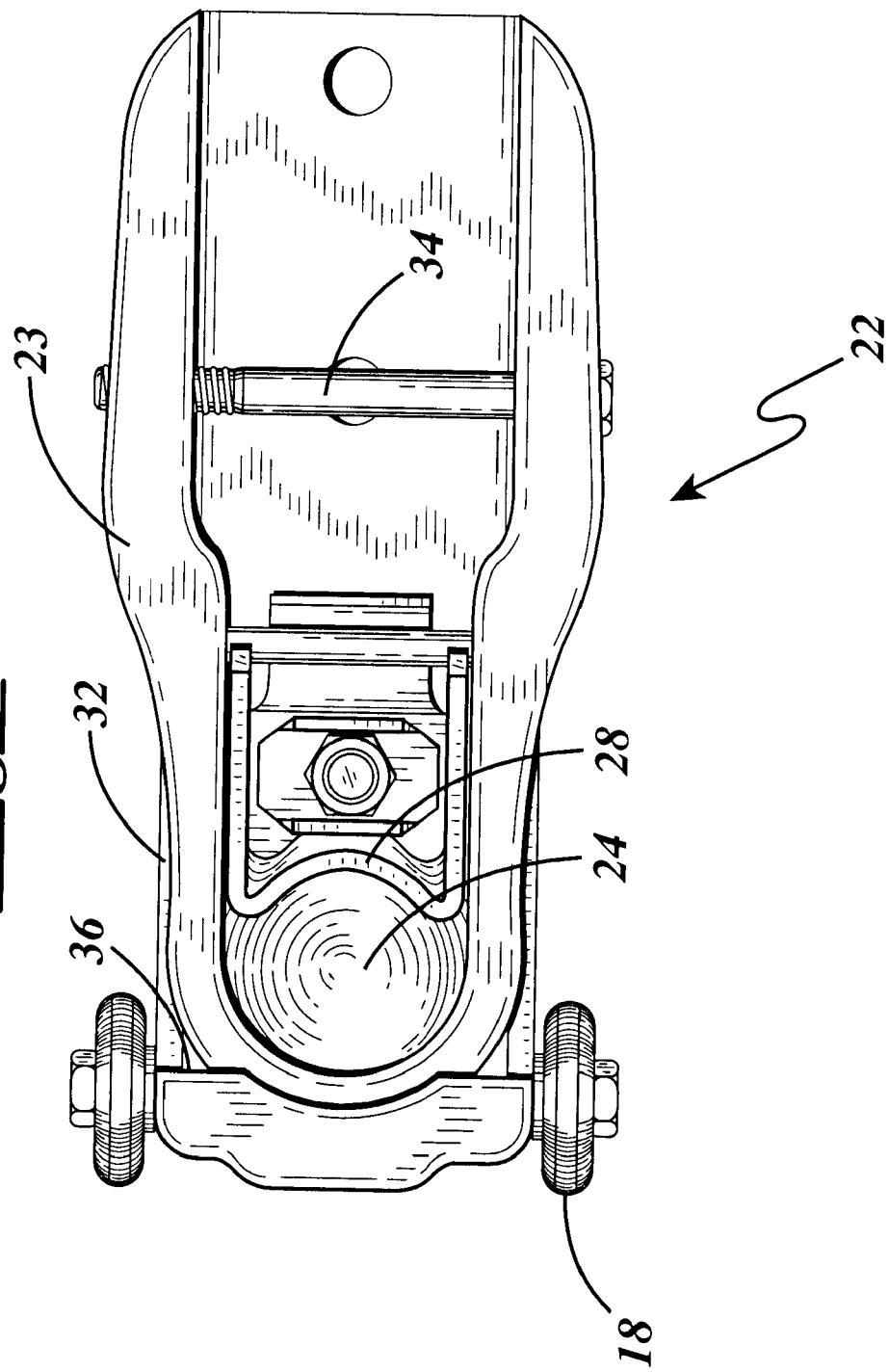
FIG. 2 is a partial fragmentary bottom plan view of the trailer coupler of the type shown in FIG. 1, removed from the trailer tongue.
Figure 7:
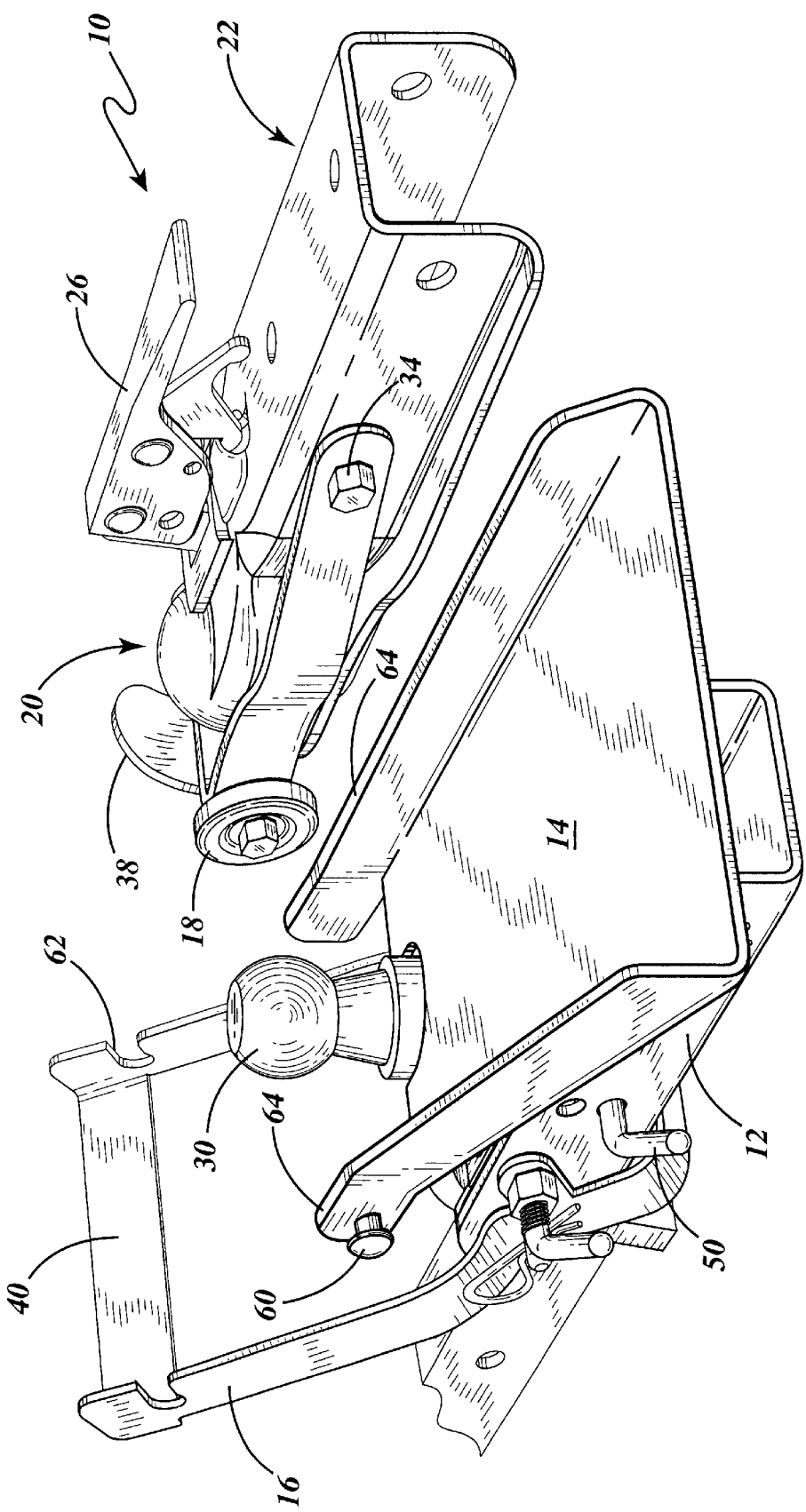
FIG. 7 is a front perspective view of the ramp disengaged from the support arm with the trailer coupler shown elevated above the ramp for clarity.

Referring first to FIGS. 1 and 7, there is shown generally a trailer hitch guide assembly 10 of the present invention. The trailer hitch guide assembly 10 of the present invention includes a base 12, a ramp 14, a support arm 16, and wheels 18 attached to a forward end 20 of a trailer coupler or hitch 22. The trailer coupler 22 shown in FIG. 1 is of known suitable construction and includes a socket 24 formed in the end and a hold down assembly 26 that includes a latch 28 that wraps under a portion of the ball 30 to restrict removal of the ball 30 from the socket 24 (see FIG. 2). A first embodiment of the frame 32 is mounted to the trailer coupler 22, with a bolt 34 extending through bores (unnumbered) formed in the side of the trailer coupler 22. The bore (unnumbered) is oftentimes pre-existing in a trailer coupler 22 of known suitable construction, however, those skilled in the art will recognize that the bores (unnumbered) for the bolt 34 may be drilled into the sidewalls (unnumbered) of the trailer coupler 22. A ledge 36 extends from the frame 32 under a bottom 23 of the forward end 20 of the trailer coupler or hitch 22. Of course, the ledge 36 does not extend so far under the bottom 23 of the trailer coupler 22 to thereby block the opening to the socket 24. The ledge 36 hooks and engages the bottom 23 of the trailer coupler 22 to limit upward rotation of the frame 32 when the wheels 18 engage the ramp 14. The frame 32 further includes a lip member 38 extending upward from a forward end (unnumbered) of the frame 32. As the forward end 20 of the trailer coupler 22 advances up the ramp 14, the lip member 38 engages a crossbar 40 of the support arm 16.

The base 12 includes an upper plate 42 and lower plate 44. The upper plate 42 includes a bore (unnumbered) through which the threaded shaft (unnumbered) of the hitch ball 30 extends. The nut 46 of the hitch ball 30 is turned onto the threaded shaft (unnumbered) and tightened, thereby securing the upper plate 42 and hitch ball 30 to the ball mount 48. The lower plate 44 is fastened to the upper plate 42 with a hitch pin 50. A hitch pin 54 is used to pivotally attach the proximal end (unnumbered) of the ramp 14 to the lower plate 44 of the base 12. Similarly, a hitch pin 56 is used to pivotally attach the proximal end (unnumbered) of the support arm 16 to the lower plate 44 of the base 12. A spring clip 52 inhibits the hitch pins 50, 54, and 56 from pulling out of the respective bore (unnumbered). Use of hitch pins 50, 54, and 56 and spring clips 52 further provides for quick assembly and disassembly of the trailer hitch guide assembly 10. A hold down angle bolt 58 may be tightened to secure the support arm 16 against the lower plate 44 in the stowed position (see FIG. 5). When the hold down angle bolt 58 is loosened and the distal ends (unnumbered) of the support arm 16 and ramp 14 are pivoted towards each other, a pin 60 extending from a side 64 of the ramp 14 engages within a groove 62 formed in the support arm 16.

Figure 8:
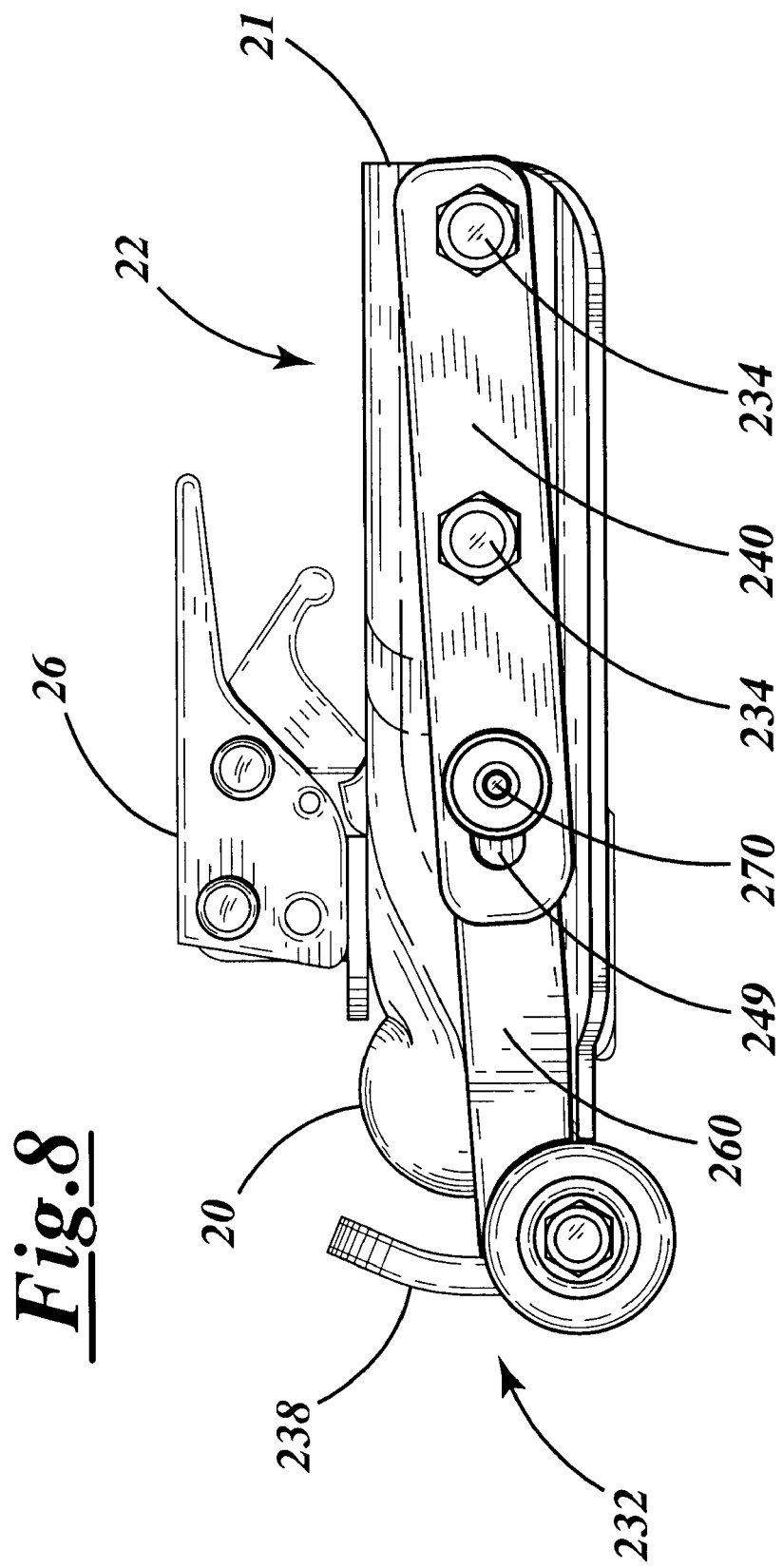
FIG. 8 is a side view of one embodiment of the invention in the first position.
Figure 9:
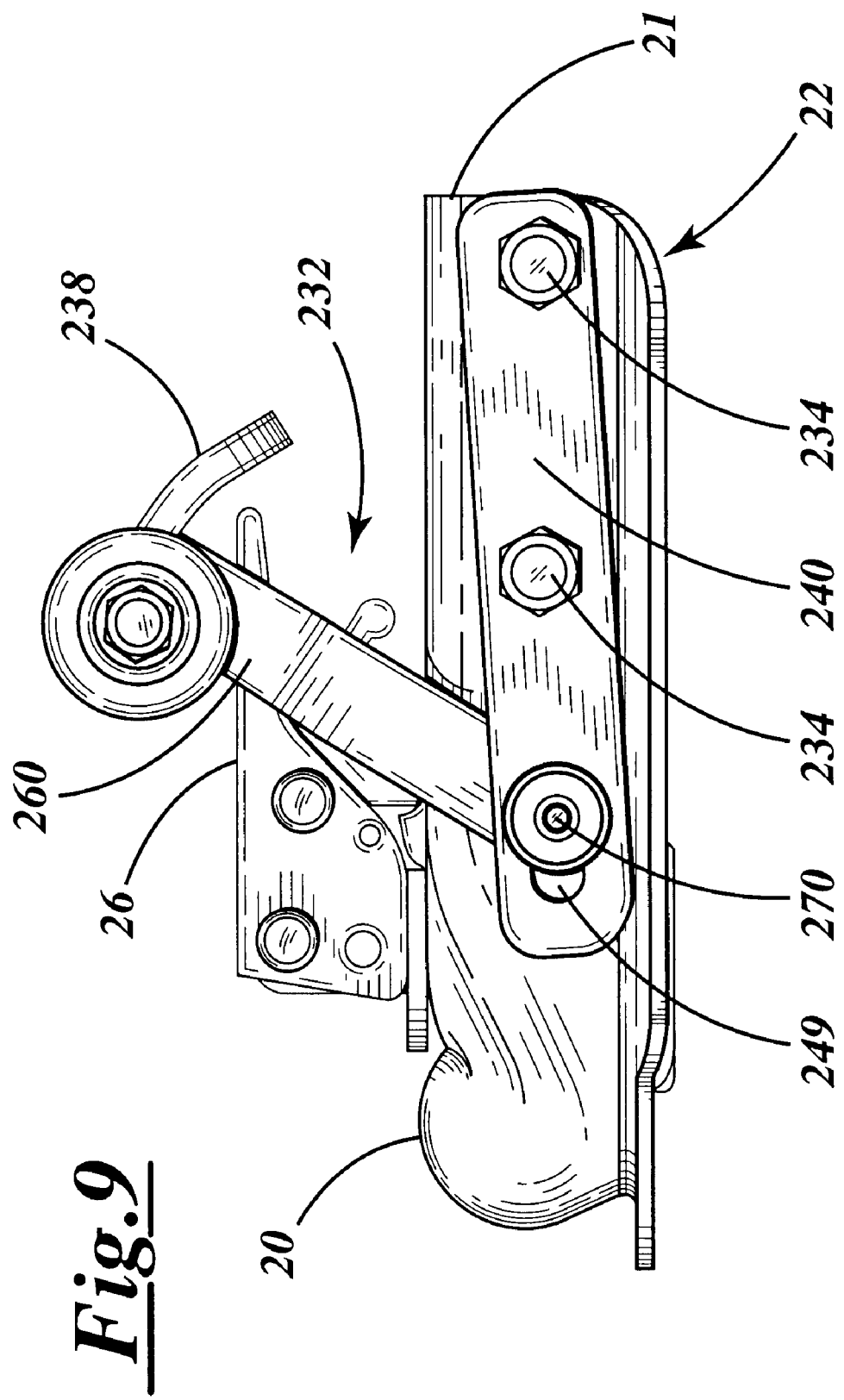
FIG. 9 is a side view of one embodiment of the invention in the second position.
Figure 10:
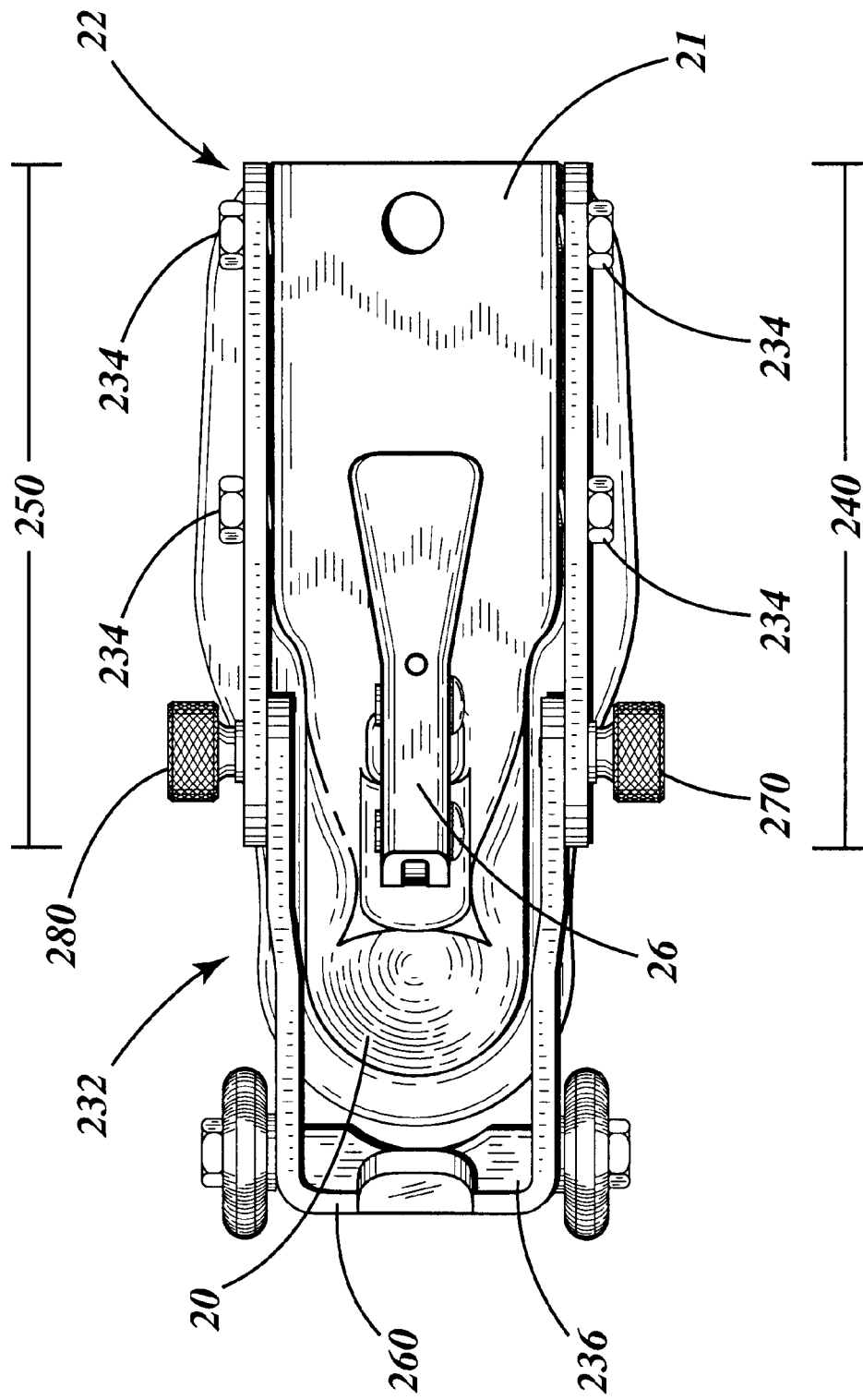
FIG. 10 is a top view of one embodiment of the invention in the first position and the primary position.
Figure 11:
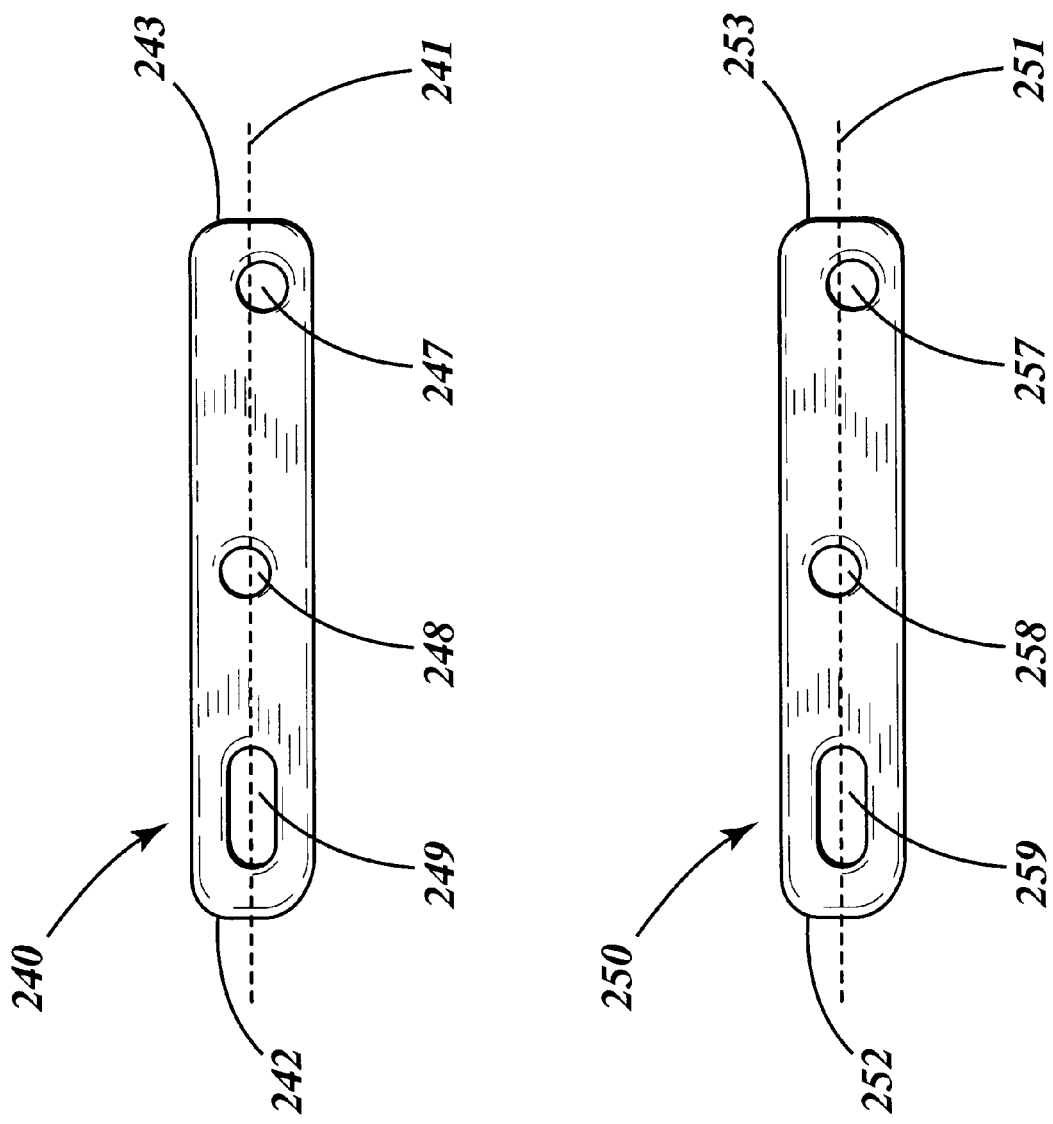
FIG. 11 is a side view of one embodiment of the first support arm and the second support arm.

As shown in FIGS. 8–15 a second embodiment of the invention comprises an articulating frame 232 and 332. As shown in FIG. 8 and 10, a first aspect of the second embodiment of the frame 232 comprises a first mounting arm 240, a second mounting arm 250, and an articulated contact plate 260. As shown in FIG. 11, the first mounting arm 240 comprises a longitudinal axis 241, a first end 242, a second end 243, a longitudinally extending first slot 249, a first mounting bore 248, and a second mounting bore 247. The first slot 249 is proximate the first end 242 of the first mounting arm 240. The mounting bores 248 and 247 are longitudinally spaced intermediate the first end 242 and second end 243 of the first mounting arm 240. The diameter (unnumbered) of the mounting bores 248 and 247 should be similar to that of the bores (unnumbered) for mounting formed in the side (unnumbered) of the trailer coupler 22. The second mounting arm 250 comprises a longitudinal axis 251, a first end 252, a second end 253, a longitudinally extending second slot 259, a first mounting bore 258, and a second mounting bore 257. The second slot 259 is proximate the first end 252 of the second mounting arm 250. The mounting bores 258 and 257 are longitudinally spaced intermediate the first end 252 and second end 253 of the second mounting arm 250. The second slot 259, first mounting bore 258 of the second mounting arm 250, and second mounting bore 257 of the second mounting arm 250 should be configured such that the dimensions are the same as the first mounting arm's 240 first slot 249, first mounting bore 248, and second mounting bore 247. The configuration of the second slot 259 on the second mounting arm 250 should be similar to the configuration of the first slot 249 on the first mounting arm 240. The diameter (unnumbered) of the mounting bores 258 and 257 should be similar to that of the bores (unnumbered) for mounting formed in the side (unnumbered) of the trailer coupler 22.

Figure 12:
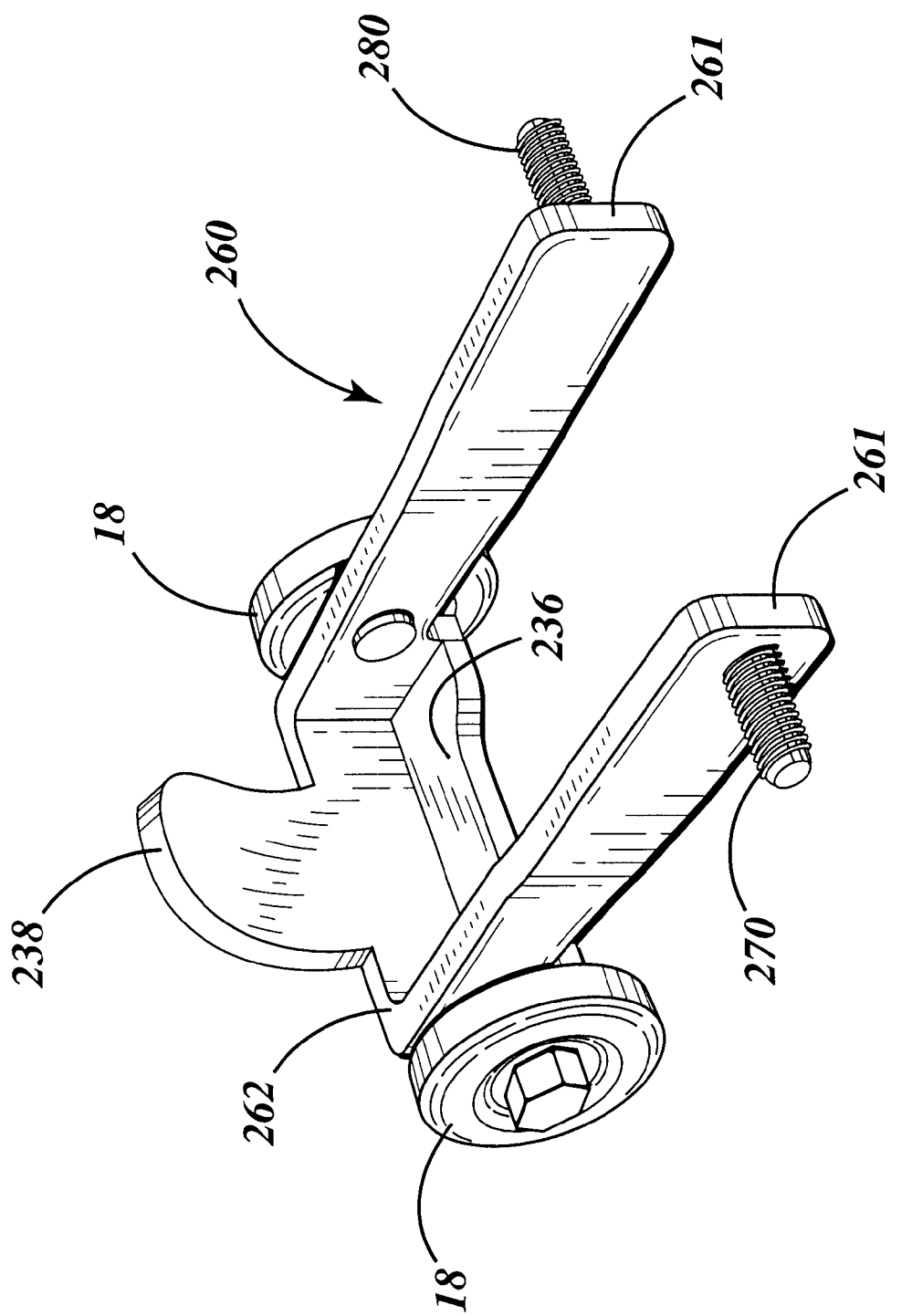
FIG. 12 is a perspective view of one embodiment of the articulated contact plate.

The articulated contact plate 260, as shown in FIG. 12, comprises at least a proximal end 261, a distal end 262, and a longitudinally extending ledge 236. The longitudinally extending ledge 236 is attached to the distal end 262 of the articulated contact plate 260. The articulated contact plate 260 is repositionally attached to the first end 242 of the first mounting arm 240 and the first end 252 of the second mounting arm 250. As shown in FIGS. 8–10, the preferred method to repositionally attach the contact plate 260 to the first and second mounting arms 240 and 250 comprises attaching a first threaded shaft 270 and a second threaded shaft 280 on the proximal end 261 of the contact plate 260 and then inserting the threaded shafts 270 and 280 into the first slot 249 and second slot 259 respectively. The threaded shafts 270 and 280 should be longitudinally and laterally positioned the same on the proximal end 261 of the contact plate 260. The diameters (unnumbered) of the shafts 270 and 280 should be such that the shafts 270 and 280 may allow rotation and longitudinal translation of the articulated contact plate-260.

The frame 232 may be mounted to the trailer hitch 22 with a bolt 234 secured in each mounting bore 258, 257, 248, and 247. The frame 232 may also be mounted to the trailer hitch 22 with a first elongated shoulder bolt 234 inserted through mounting bores 258 and 248 and a second elongated bolt 234 inserted through mounting bores 257 and 247.

Figure 13:
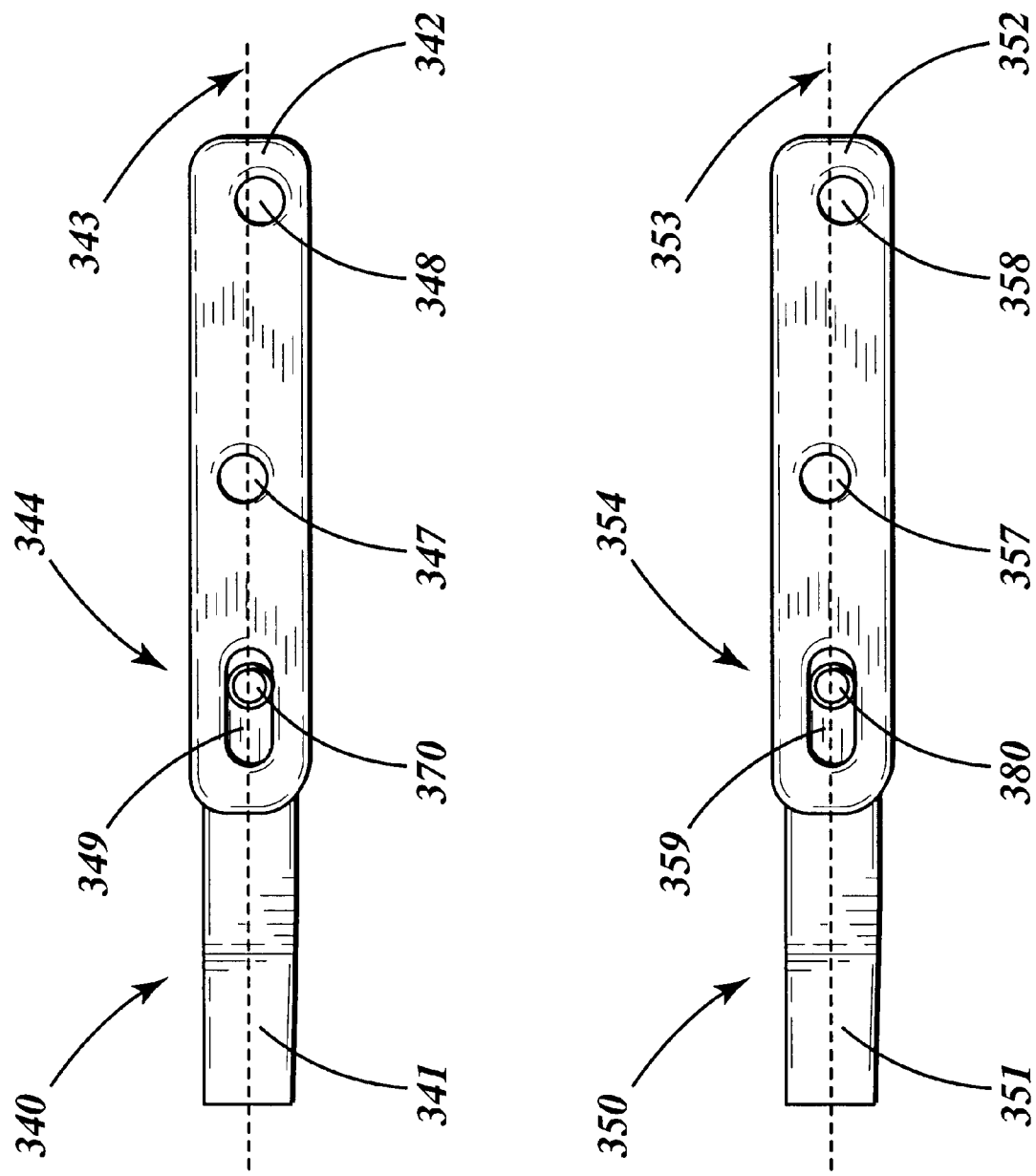
FIG. 13 is a side view of one embodiment of the first brace and the second brace.
Figure 14:
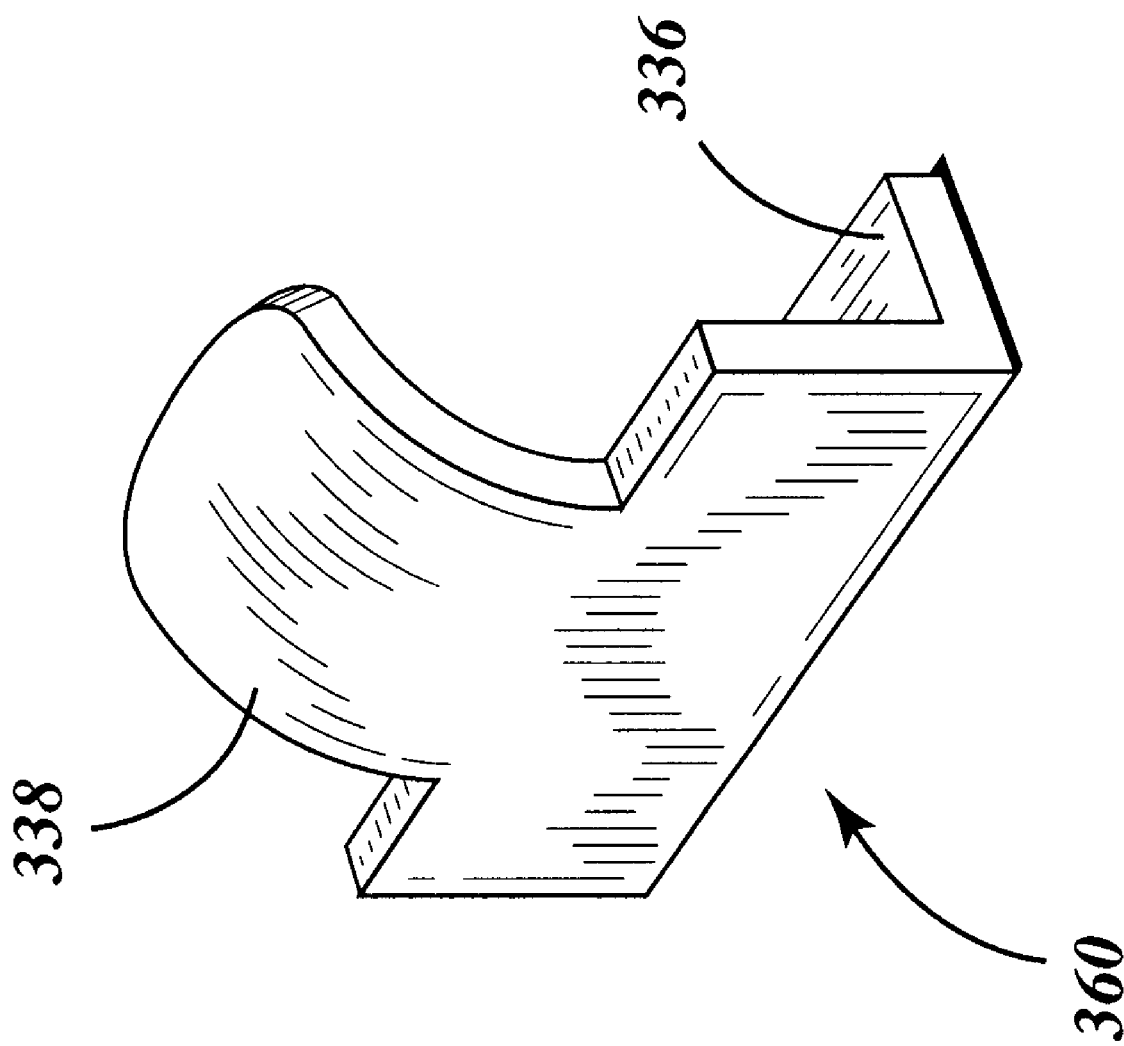
FIG. 14 is a perspective view of one embodiment of the face plate.
Figure 15:
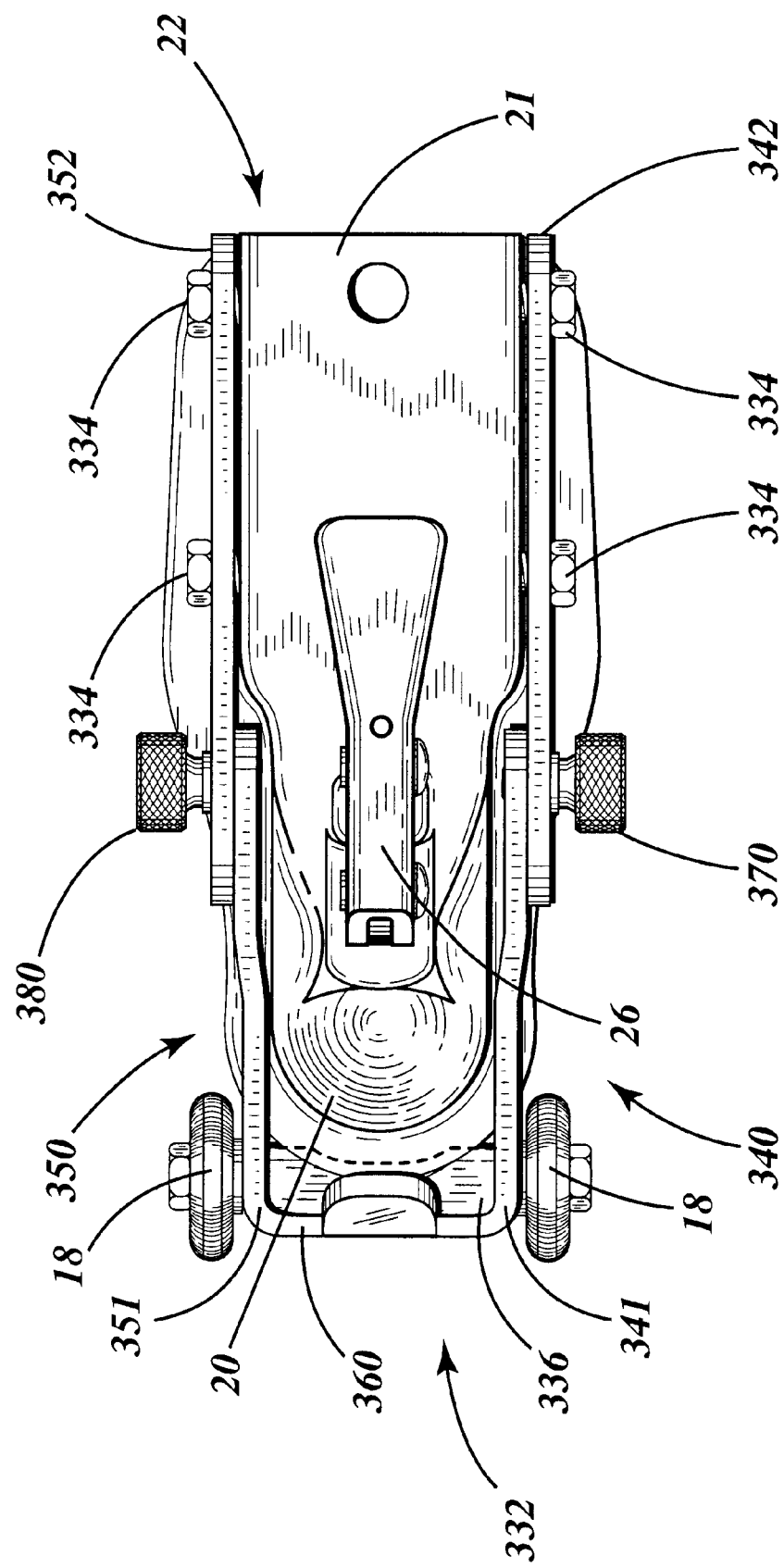
FIG. 15 is a top view of one embodiment of the invention in the first position and the secondary position.

As shown in FIGS. 13–15, another aspect of the second embodiment of the frame 332 comprises a first articulated brace 340, a second articulated brace 350, and a face plate 360. The first articulated brace 340 comprises a first end 341, a second end 342, a first joint 344 intermediate the first end 341 and the second end 342, a first mounting bore 348, and a second mounting bore 347. The mounting bores 348 and 347 are longitudinally spaced intermediate the first joint 344 and second end 342 of the first brace 340. The diameter (unnumbered) of the mounting bores 348 and 347 should be similar to that of the bores (unnumbered) for mounting formed in the side (unnumbered) of the trailer coupler 22. As shown in FIG. 13, the first joint 344 is located intermediate the first end 341 and the second end 342 of the first brace 340. In the preferred embodiment of the frame 332, the first joint 344 comprises a threaded shaft 370 attached to the first brace 340 intermediate the first end 341 and the second mounting bore 347. The shaft 370 may be inserted into a longitudinally extending first slot 349 intermediate the first end 341 and the second mounting bore 347. The diameter (unnumbered) of the shaft 370 should be such that the shaft 370 may rotate and longitudinally translate within the first slot 349.

The second articulated brace 350 comprises a first end 351, a second end 352, a second joint 354 intermediate the first end 351 and the second end 352, and a first mounting bore 358, and a second mounting bore 357. The mounting bores 358 and 357 are longitudinally spaced intermediate the second joint 354 and the second end 352 of the second brace 350. The diameter (unnumbered) of the mounting bores 358 and 357 should be similar to that of the bores (unnumbered) for mounting formed in the side (unnumbered) of the trailer coupler 22. As shown in FIG. 13, the second joint 354 is located intermediate the first end 351 and the second end 352 of the second brace 350. In the preferred embodiment of the frame 332, the second joint 354 comprises a threaded shaft 380 attached to the second brace 350 intermediate the first end 351 and the second mounting bore 357. The shaft 380 may be inserted into a longitudinally extending second slot 359 intermediate the first end 351 and the second mounting bore 357. The diameter (unnumbered) of the shaft 380 should be such that the shaft 380 may rotate and longitudinally translate within the second slot 359.

The face plate 360, as shown in FIG. 14, has a longitudinally extending ledge 336. As shown in FIG. 15, the face plate 360 is attached proximate the first end 341 of the first brace 340 and the first end 351 of the second brace 350 such that a lateral space is formed between the first brace 340 and the second brace 350.

The frame 332 may be mounted to the trailer hitch 22 with a bolt 334 secured in each mounting bore 358, 357, 348, and 347. The frame 332 may also be mounted to the trailer hitch 22 with a first elongated shoulder bolt 334 inserted through mounting bores 358 and 348 and a second elongated bolt 334 inserted through mounting bores 357 and 347.

Use

Figure 3:
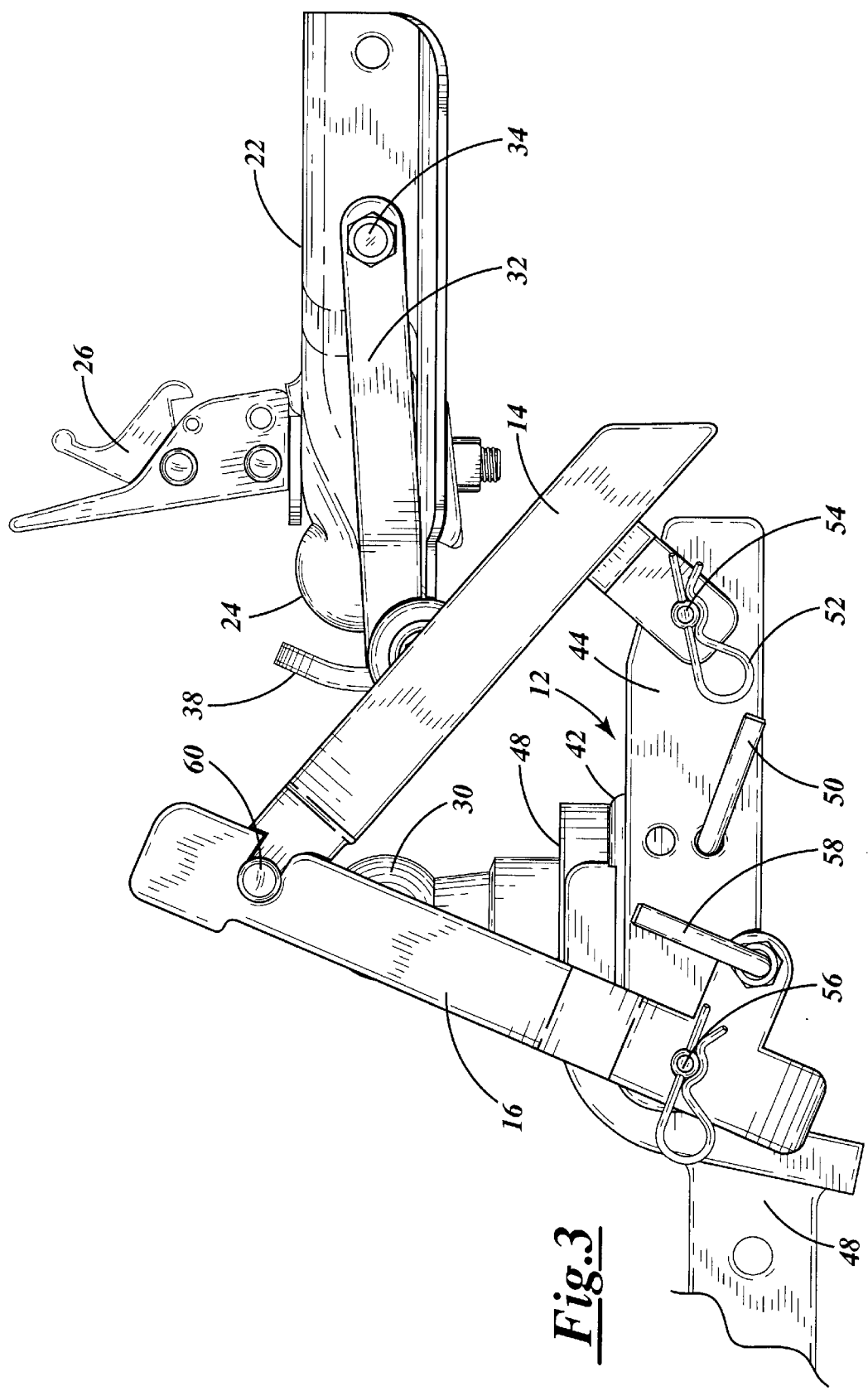
FIG. 3 is a partial fragmentary side elevational view of the trailer coupler or hitch in contact with the ramp of the trailer hitch guide of the present invention.
Figure 4:
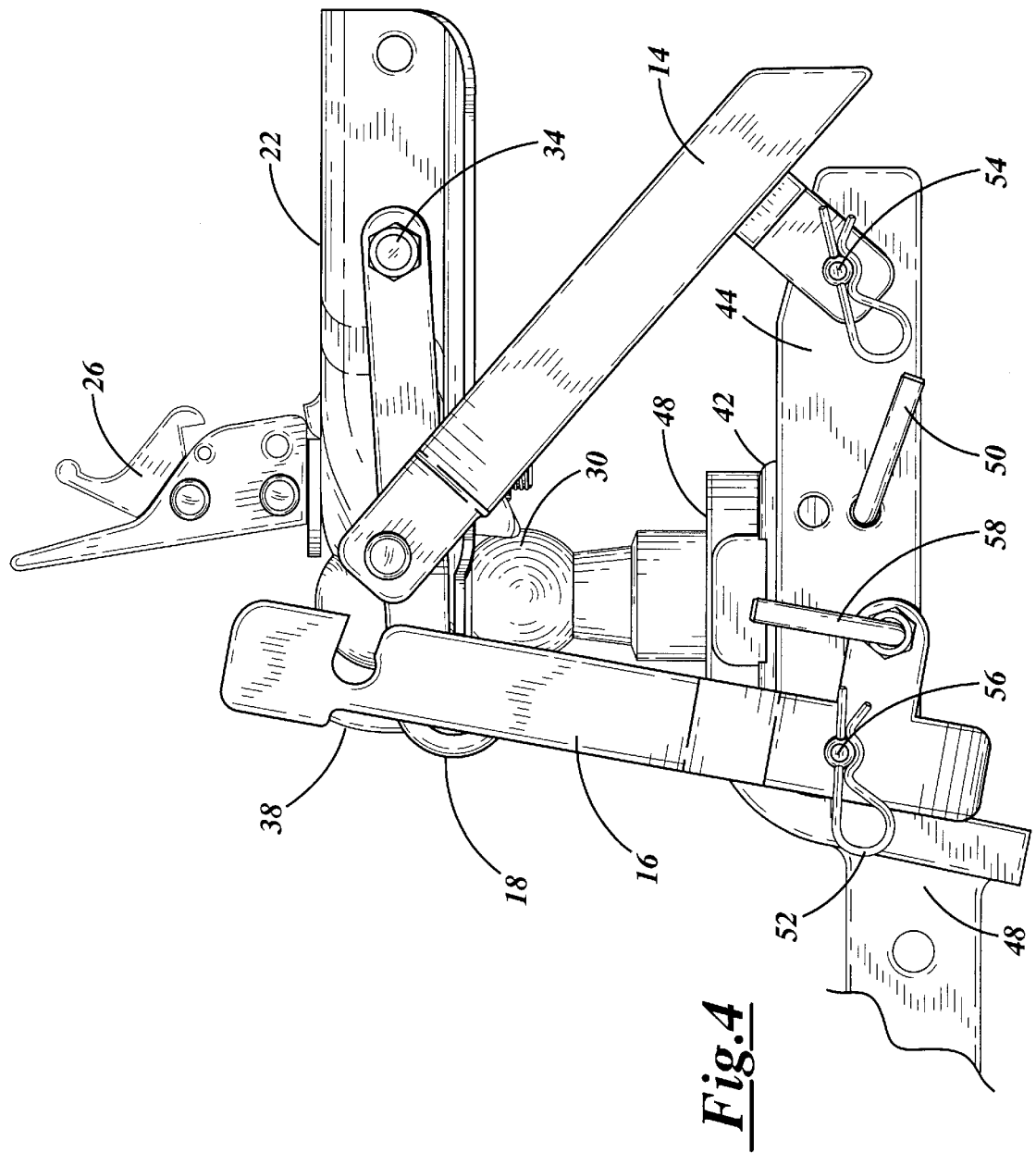
FIG. 4 is a partial fragmentary side elevational view of the trailer hitch in an elevated position from that shown in FIG. 3 and disengaging the support arm from the ramp.

Having described the constructional features of the present invention the mode of use will be described in greater detail in conjunction with FIGS. 3–6, 8–10, and 15. In use, the upper plate 42 of the base 12 is mounted to the ball mount 48 and the frame 32, 232, and 332 is mounted to the trailer coupler or hitch 22. The lower plate 44 of the base 12 is mounted to the upper plate 42 and then the ramp 14 and support arm 16 are pivotally attached to the lower plate 44. The user (not shown) then pivots the distal ends (unnumbered) of the ramp 14 and support arm 16 towards each other until pins 60 extending from the sides 64 of the ramp 14 slide into the groove 62 formed in the support arm 16, as shown in FIG. 3. When the user (not shown) is ready to couple the trailer hitch 22 to the vehicle (not shown), the user (not shown) first blocks the trailer wheels (not shown) to restrict the trailer (not shown) from rolling backwards. The tongue (not shown) is raised to a height slightly above the height of the bottom (unnumbered) of the ramp 14. The user (not shown) then backs the vehicle (not shown) towards the front end of the tongue of the trailer (not shown). As the user (not shown) continues to drive the vehicle (not shown) backwards, the wheels 18 roll up the ramp 14 and the ramp sides 64 guide the trailer coupler 22 into alignment over the hitch ball 30.

As the vehicle (not shown) continues to move backwards, the forward end of the trailer (not shown) continues to move up the ramp 14, thereby lifting the forward end of the trailer (not shown). As the vehicle (not shown) continues backwards, the lip member 38, 238, and 338 extending upward from the frame 32, 232, and 332 engages the crossbar 40 of the support arm 16 and pushes the support arm 16 out of engagement with the ramp 14. As the ramp 14 and support arm 16 disengage, the socket 24 of the trailer coupler 22 lowers onto the hitch ball 30. The hold down assembly 26 may be pivoted downward to engage and lock the latch 28 under a portion of the hitch ball 30 (see FIG. 5). In this manner, the trailer hitch guide assembly 10 of the present invention effectively elevates and guides a forward end 20 of the trailer coupler 22 into coupling engagement with the vehicle hitch (unnumbered). The trailer (not shown) may be towed without removing the ramp 14 or alternatively, the ramp 14 may be removed, inverted and re-mounted to the lower plate 44 of the base 12 in its storage position (see FIG. 6). Of course, those skilled in the art will appreciate that the vehicle hitch (unnumbered) may alternatively be mounted to the front end of the vehicle frame (not shown) and the trailer hitch guide assembly 10 may be mounted thereto.

As shown in FIGS. 8–10 and 15 the second embodiment of the invention has an articulating frame 232 and 332. The articulating frame 232 and 332 allows the user (unnumbered) to reposition the frame 232 and 332 so that no part of the frame 232 and 332 is between the forward end 20 of the trailer hitch 22 and the vehicle (not shown). This feature is important when the trailer hitch assembly 10 is used on vehicles (not shown) equipped with surge brakes (not shown), or maneuverability of the vehicle (not shown) requires greater clearance between the trailer hitch 22 and the vehicle (not shown).

Figure 5:
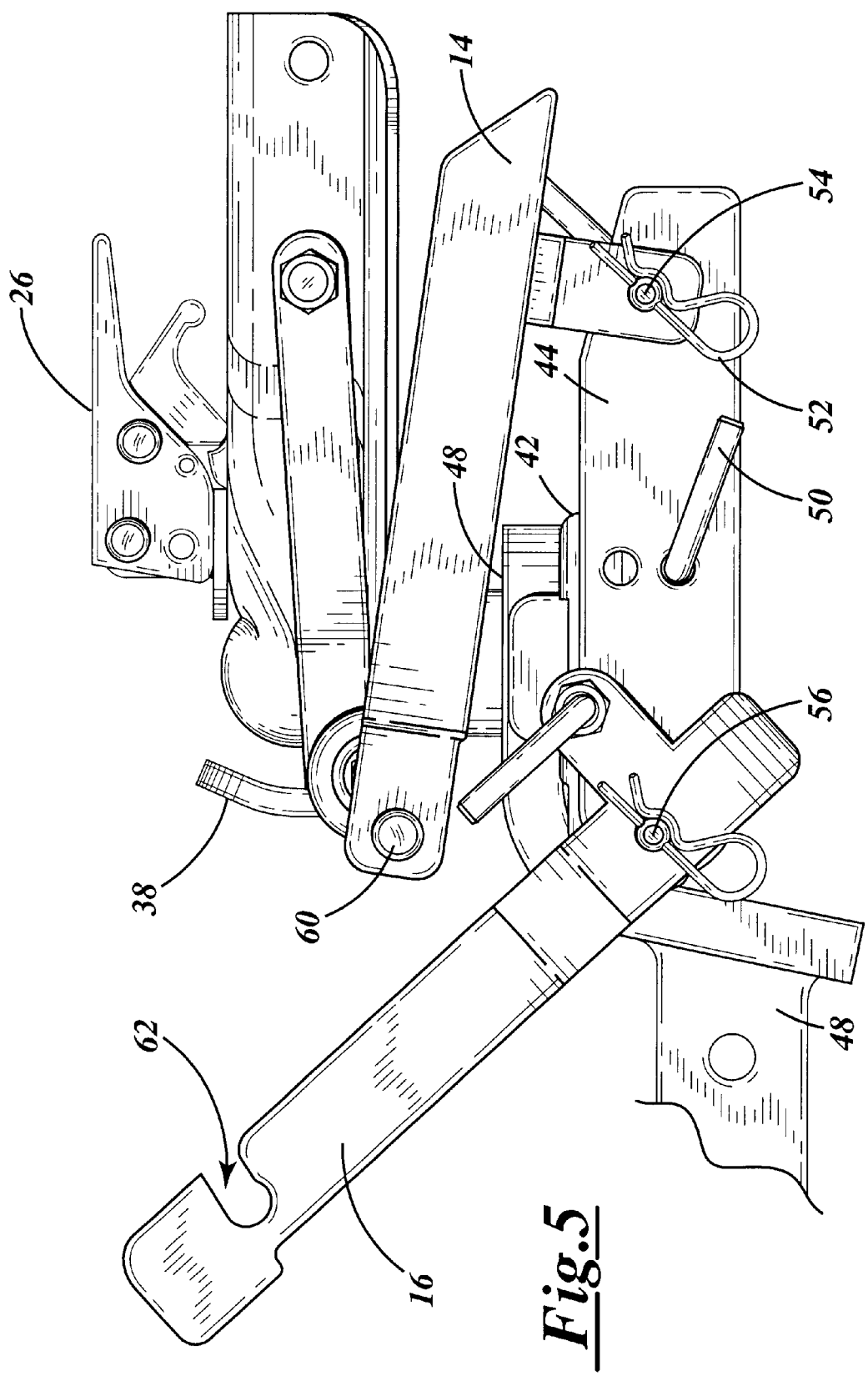
FIG. 5 is a partial fragmentary side elevational view of the trailer hitch coupled to the hitch ball.
Figure 6:
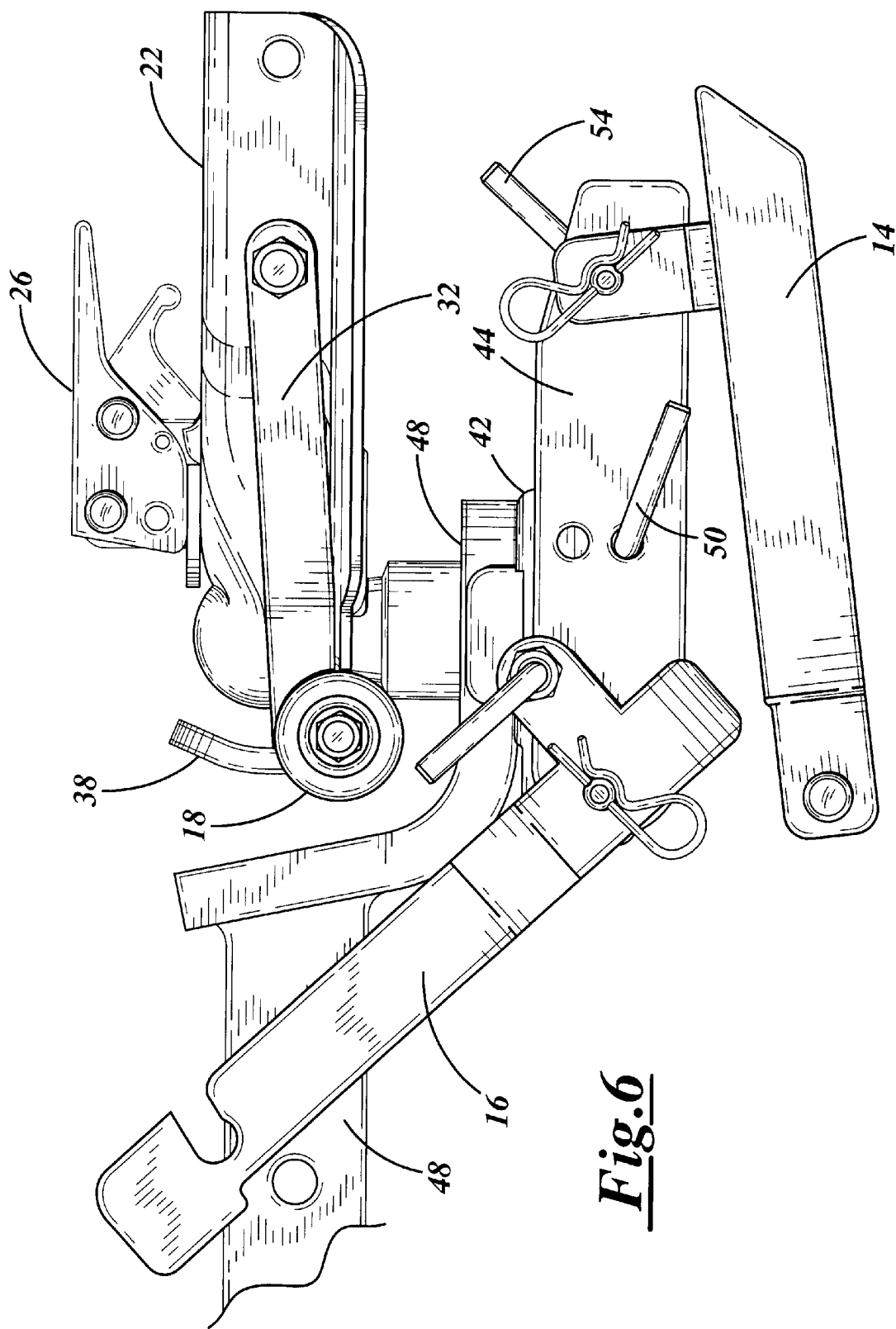
FIG. 6 is a partial fragmentary side elevational view of the trailer hitch coupled to the hitch ball with the ramp inverted in the stowed position, wherein the ball mount is oriented with a drop.

The frame 232 and 332 articulates between a first and second position and a primary and secondary position. As shown in FIGS. 8 and 1 5, the frame 232 and 332 is in the first position when the face plate 360 or the contact plate 260 longitudinally extends past the forward end 20 of the trailer hitch 22. The frame 232, as shown in FIG. 9, is in the second position when the contact plate 260 does not extend longitudinally past the forward end 20 of the trailer hitch 22. The frame 232 is in the primary position, as shown in FIG. 10, when the contact plate 260 is positioned and arranged so as to form a longitudinal gap (unnumbered) between the ledge 236 and the forward end 20 of the trailer hitch 22. As shown in FIG. 15, the frame 332 is in the secondary position when the face plate 360 is positioned and arranged so that the bottom 23 of the forward end 20 of the trailer hitch 22 rests on the ledge 336 and no longitudinal gap (not numbered) is formed. Once the articulated frame 232 and 332 is in the position desired by the user (not shown) the frame 232 and 332 should be secured so as not to articulate between positions. The frame 232 and 332 may be secured by inserting nuts (not shown) or wing nuts (not shown) on the shafts 270, 280, 370, and 380 and tightening to prevent articulation of the face plate 360 or the contact plate 260.

This invention has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment and operating procedures, can be accomplished without departing from the scope of the invention itself.

I claim:

1. A frame for attachment to a trailer hitch having a forward end(s), for purposes of facilitating alignment and coupling of the trailer hitch to a vehicle hitch, comprising:
    a contact plate pivotally attached to the trailer hitch for pivoting as between a first position extending longitudinally forward of the forward end of the trailer hitch and a second position extending transversely above and longitudinally behind the forward end of the trailer hitch.

2. A frame for attachment to a trailer hitch having longitudinally spaced forward and rearward ends and a bottom, for purposes of facilitating alignment and coupling of the trailer hitch to a vehicle hitch, comprising:
    an articulated contact plate, having a proximal end, a distal end, and a longitudinally extending ledge positioned near the distal end, repositionally attached to the trailer hitch for repositioning of the contact plate as between a primary position wherein the contact plate is positioned and arranged so as to form a longitudinal gap between the ledge and the forward end of the trailer hitch and a secondary position wherein the contact plate is positioned and arranged so that the bottom of the forward end of the trailer hitch rests on the ledge and no longitudinal gap is formed.

3. A frame for attachment to a trailer hitch having longitudinally spaced forward and rearward ends, for purposes of facilitating alignment and coupling of the trailer hitch to a vehicle hitch, comprising:
    (a) a first articulated brace having a first end and a second end wherein the articulated brace has a first joint intermediate the first end and the second end;
    (b) a second articulated brace having a first end and a second end wherein the articulated brace has a second joint intermediate the first end and the second end; and
    (c) a face plate attached proximate the first end of the first brace and the first end of the second brace wherein the face plate is repositionable as between a first position wherein the face plate longitudinally extends past the forward end of the trailer bitch and a second position wherein the face plate does not longitudinally extend past the forward end of the trailer hitch.

4. A frame as recited in claim 3 wherein the first joint is a first pivot and the second joint is a second pivot.

5. A frame as recited in claim 3 wherein the face plate is repositionable by pivoting.

6. A frame for attachment to a trailer hitch having longitudinally spaced forward and rearward ends and a bottom, for purposes of facilitating alignment and coupling of the trailer hitch to a vehicle hitch, comprising:
    (a) a first articulated brace having a longitudinal axis, a first end, a second end, and a first joint intermediate the first end and the second end, attached to the trailer hitch;
    (b) a second articulated brace having a longitudinal axis, a first end, a second end, and a second joint intermediate the first end and the second end, attached to the trailer hitch; and
    (c) a face plate, having a longitudinally extending ledge, attached proximate the first end of the first brace and the first end of the second brace wherein the face plate is repositionable as between a primary position wherein the face plate is positioned and arranged so as to form a longitudinal gap between the ledge and the forward end of the trailer hitch and a secondary position wherein the face plate is positioned and arrange so that the bottom of the forward end of the trailer hitch rests on the ledge and no longitudinal gap is formed.

7. A frame as recited in claim 6 wherein the first joint is a first shaft and a longitudinally extending first slot in the first brace and the second joint is a second shaft and a longitudinally extending second slot in the second brace.

* * * * *

UNITED STATES PATENT AND TRADEMARK OFFICE
CERTIFICATE OF CORRECTION

PATENT NO. : 6,698,783 B1
DATED : March 2, 2004
INVENTOR(S) : Zechbauer

It is certified that error appears in the above-identified patent and that said Letters Patent is hereby corrected as shown below:

Column 4,
Line 53, "HoldDown" should be changed to -- Hold Down --;
Line 62, "Ar" should be changed to -- Arm --

Column 7,
Line 22, "plate-260" should be changed to -- plate 260 --

Column 9,
Line 14, "1 5" should be changed to -- 15 --;
Line 47, "end(s)" should be changed to -- end --

Signed and Sealed this

Fifteenth Day of March, 2005

JON W. DUDAS
*Director of the United States Patent and Trademark Office*